United States Patent [19]
Qualey

[11] 4,115,173
[45] Sep. 19, 1978

[54] VALVE BASE ROUGHENING PROCESS

[75] Inventor: Christian H. Qualey, Altavista, Va.

[73] Assignee: National Distillers and Chemical Corporation, New York, N.Y.

[21] Appl. No.: 854,307

[22] Filed: Nov. 23, 1977

[51] Int. Cl.$^2$ .................... B29H 15/00; B29C 27/00
[52] U.S. Cl. ................................. 156/120; 156/245; 156/306; 264/248; 264/293; 264/296; 264/236; 264/347
[58] Field of Search ............ 264/36, 162, 249, 299, 264/318, 328, 293, 296, 236, 347; 156/120, 245, 306

[56] References Cited
U.S. PATENT DOCUMENTS

| | | | |
|---|---|---|---|
| 1,938,816 | 12/1933 | Eger | 156/120 |
| 2,065,033 | 12/1936 | Stevens | 156/120 |
| 2,120,346 | 6/1938 | Becker | 156/120 |
| 2,230,879 | 2/1941 | Bronson | 156/120 |
| 2,253,759 | 8/1941 | Burkley | 156/120 |
| 4,010,052 | 3/1977 | Edwards | 156/120 |

*Primary Examiner*—Willard E. Hoag
*Attorney, Agent, or Firm*—Kenneth D. Tremain

[57] ABSTRACT

The thorough bonding required between the base or flange of a molded rubber sleeve for a valve, and a tire tube of rubber or the like, is realized by simulating the roughened effect normally produced through abrasion. Such effect is achieved by specially configuring the surface of the base in the molding process; that is to say, the surface normally resulting from abrasion is equivalently produced by forming the contacting surface of the critical mold portion (such as a plunger or the like) in a cross-hatched or knurled pattern, whereby a desired cross-hatched pattern is formed in the particular surface of the base.

5 Claims, 6 Drawing Figures

VALVE BASE ROUGHENING PROCESS

BACKGROUND, OBJECTS AND SUMMARY OF THE INVENTION

The present invention pertains to the manufacture of valves and like devices, and particularly to a process of efficiently producing valve stems surrounded by rubber or the like so as to form an assembly that is easily attachable to rubber tubes adapted for use in tires.

In order to provide complete background information so that the objectives and purposes of the present invention may be thoroughly appreciated, reference may be made to a number of U.S. Pat. Nos. 583,437; 1,931,649; 1,938,816; 2,014,129; 2,499,565; 2,600,942; 2,724,423; 3,474,498. In particular, U.S. Pat. No. 583,437 relates to a method of molding, around a valve stem, a rubber sleeve, the base of which is formed with depressions or corrugations; such construction is for the purpose of preventing shearing strain from being exerted on the base due to the normal creeping of the tire tube on the wheel rim with which the valve stem is associated. U.S. Pat. No. 1,938,816 discloses a general notion of roughening the surface of a sectional mold which is designed to vulcanize or otherwise unite a valve stem base member to a tire tube. However, the purpose of the method of this latter patent is to insure that the roughening provided in the resultant product spans the seam between the edges of the base member and the tire tube; accordingly, the roughening of the base member is produced on a surface not extensively in contact with the tube. As will be made clear hereinafter, the purposes and objects of the present invention differ substantially from the aforecited art.

It has long been known to fabricate valve stem assemblies in which processes a conventional valve stem is surrounded by a sleeve of rubber material which is so shaped or formed as to have a broad base or flange member suitable for attaching the entire assembly to a rubber tube. The attachment or joinder is generally accomplished by a vulcanization or similar step; however, in performing same it has been necessary, in order to insure proper bonding, to provide that the outer surface of the base or flange of the rubber sleeve be suitably roughened. The roughening is conventionally accomplished by abrading the aforenoted molded surface, generally by mounting the valve assemblies with respect to dials in a buffing machine which is indexed on successive wire wheel brushes.

It will be understood that the roughening or abrading process is a time-consuming operation; accordingly, it is a primary object of the present invention to eliminate this abrading or roughening step while enabling the same satisfactory bonding in the subsequent vulcanization procedure.

Another object is to reduce substantially the cost of the bonding process by completely eliminating the roughening step.

A primary feature of the present invention resides in the fulfillment of the above objects by providing that the mold plunger or similar portion of the mold apparatus be so configured that the outer surface of the base or flange will simulate the normally roughened surface. This is achieved by a configuration of fine cross-hatching or knurling, by which is meant that the surface of the mold portion preferably has a series of intersecting ridge lines with grooves defined therebetween, the particular pattern generally being diamond or V-shaped and with very close spacing between the ridge lines. The configuration for the mold portion is realized by well-known machining processes to produce the requisite pattern.

Considered in its method aspects, the present invention achieves, in a subsequent vulcanization step, effective bonding between the base or flange of a molded rubber valve device and a tire tube of rubber or the like, involving appropriate configuring or patterning of the surface of said base which contacts the tube surface, by the improvement which comprises simulating the required base surface normally resulting from abrasion by forming the surface of the contacting mold portion in a cross-hatched pattern.

The resulting product of the present invention is a valve or valve stem device which is surrounded by a rubber sleeve or the like having a base or flange member whose outer surface is configured as already described; that is, whose surface is cross-hatched due to contact with a cross-hatched mold portion.

Other and further objects, advantages and features of the present invention will be understood by reference to the following specification in conjunction with the annexed drawing, wherein like parts have been given like numbers.

DESCRIPTION OF PREFERRED EMBODIMENT

Figure 4:
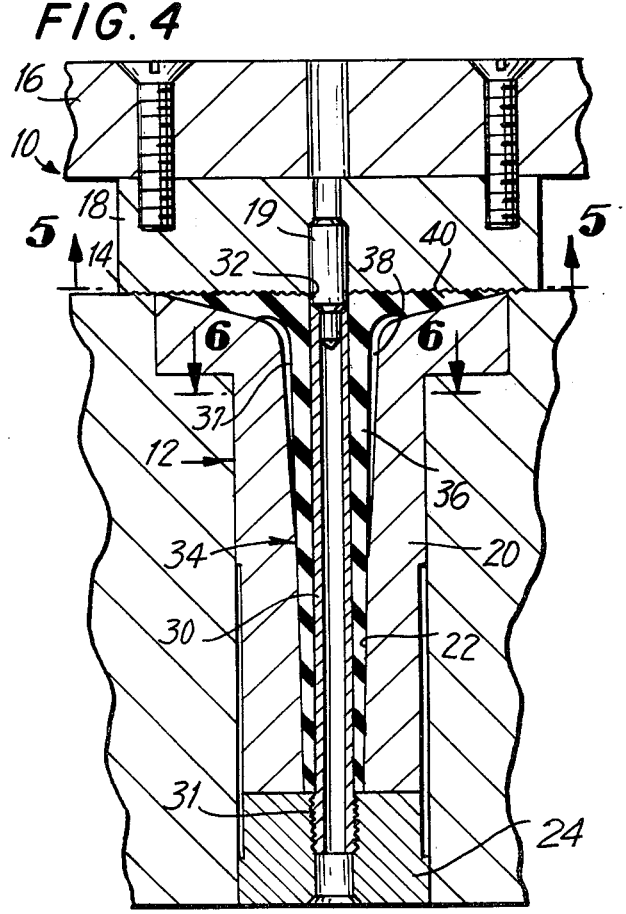
FIG. 4 is a vertical sectional view of the mold apparatus and the valve stem assembly formed by such mold apparatus.

Referring now to the drawing figures, there will be seen in FIG. 4 a mold apparatus comprising an upper part 10 and a lower part 12 shown together at a parting line 14 when the mold is closed. The upper part 10 includes a top plate 16 to which is mounted a plunger 18; fitted within the plunger 18 is a mold pin 19 for purposes which will become apparent. The lower part 12 includes a mold plate 20, defining a mold cavity 22, and a bushing 24. Retained within the mold cavity 22 is the required valve stem 30 around which rubber or the like is to be molded to form a sleeve 34. The valve stem 30 protrudes into the bushing 24, such that the portion 31 of the valve stem will not be surrounded by the rubber sleeve.

Figure 1:
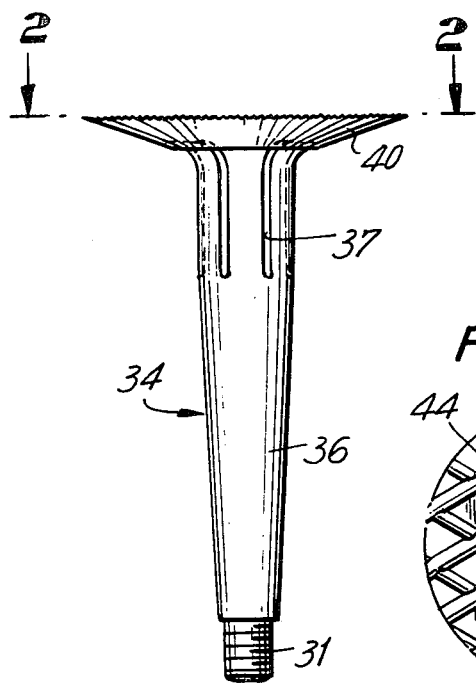
FIG. 1 is an elevation view of the valve stem assembly of the present invention.

It will be appreciated that in the process of molding the rubber sleeve, the rubber material is prevented from entering the interior of the valve stem 30 by reason of the positioning of the mold pin 19 which thereby also serves to define a suitable aperture 32 in the rubber material constituting the sleeve 34. The sleeve 34 includes a cylindrically molded portion 36, as will be apparent, and in which there is included at the upper end a series of spaced, axially extending, grooves 37 at the outer periphery of the sleeve. These grooves are for the purpose of permitting escape of air from between an inner tube and tire when same are mounted on a rim. To produce such grooves the inner periphery of the mold plate 20 includes protrusions or ridges 38. As will be seen in FIG. 1, the sleeve 34 flares out into a base or flange member 40, which is shown as having been formed at the upper end of the mold cavity 22.

Figure 2:
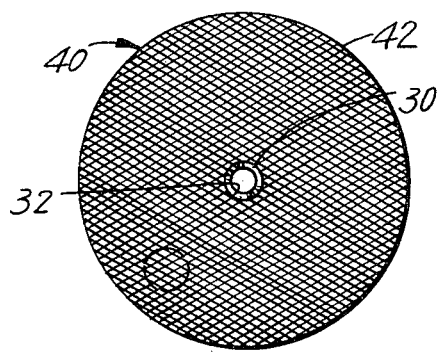
FIG. 2 is a top plan view taken on the line 2—2 of FIG. 1 and illustrating the cross-hatched pattern produced in the upper surface of the sleeve which forms part of the valve stem assembly in accordance with the present invention.
Figure 3:
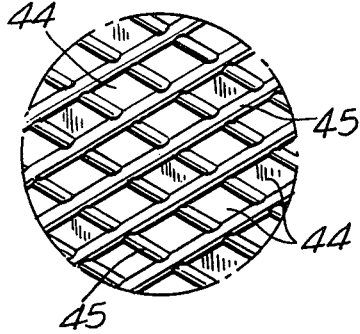
FIG. 3 is an enlarged view of a portion of the cross-hatched pattern of FIG. 2.
Figure 5:
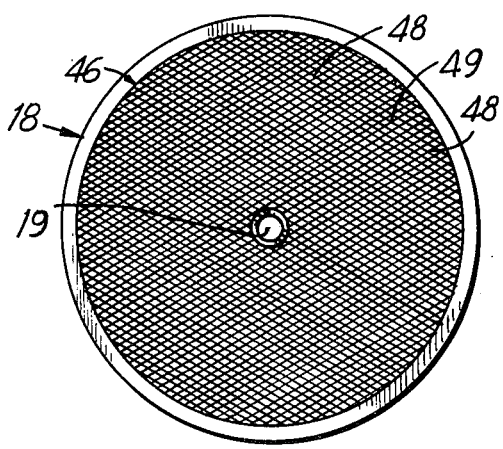
FIG. 5 is a bottom plan view taken on the line 5—5 of FIG. 4, particularly illustrating the machined cross-hatched pattern in the mold plunger.
Figure 6:
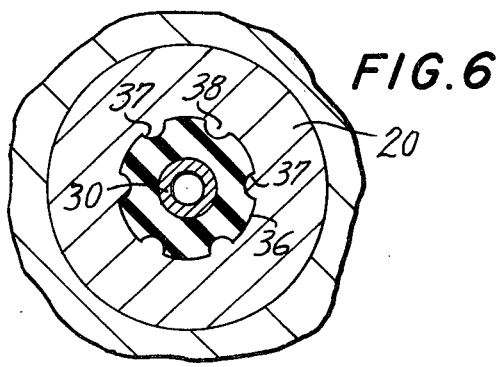
FIG. 6 is a sectional view taken on the line 6—6 of FIG. 4, particularly illustrating details of the mold plate and the grooves formed thereby.

The primary feature in accordance with the present invention may be understood by particular reference to FIG. 2 in which the outer surface 42 of the base or flange member 40 is clearly illustrated as being configured in a very special manner. This configuration involves a plurality of very finely formed depressions 44 (FIG. 3), in a triangular or diamond shape and defined by intersecting ridge lines 45. This pattern, which will be referred to as a cross-hatched pattern, results from the configuration of the corresponding plunger face 46 (FIG. 5) which is constructed to have just the negative of the configuration seen in FIGS. 2 and 3. Thus FIG. 5 shows a series of raised diamond-shaped mesas 48, which are produced by machining closely spaced intersecting grooves 49 into the particular surface 46 of the plunger 18. The acute angles of the mesas 48 are approximately 60° and the spacing between the individual mesas is preferably about ten to thirty thousandths of an inch. By this finely produced cross-hatched pattern, the required roughened effect normally produced by abrasion is simulated in the outer surface 42 of the base or flange 40 of the sleeve 34.

Accordingly it will be understood that the technique or method of the present invention results in a valve stem assembly which can be more economically produced inasmuch as the abrasion step has been eliminated. It will be appreciated that except for the machining required in producing the necessary configured surface 46, the mold apparatus illustrated in FIG. 4 is entirely conventional. Thus once this machining has been accomplished, a tremendous number of the suitably molded valve stem assemblies can be manufactured, meeting all the criteria for efficient attachment of the molded assembly to a tire tube or the like by reason of the required textured or roughened configuration for the appropriate surface 42 of the base or flange of sleeve 34.

It will be understood that subsequent to the molding operation as described, any surface mold skin which may adhere can be removed by passing each valve under a pumice spray and thereafter each is subjected to a lukewarm water spray to remove the pumice.

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

What is claimed is:

1. In a method for bonding a base on flange of a molded rubber valve device to a rubber pneumatic tube, said method including molding a sleeve, which includes said base, around the valve device, said base having its outer surface formed by a contacting surface of a mold plunger: and roughening said outer surface of said base which is to contact extensively the rubber tube surface and vulcanizing said base to said tube; the improvement comprising: performing said roughening step by shaping said outer surface into a cross-hatched or knurled pattern with said mold plunger.

2. In a method as defined in claim 1, the improvement which further comprises producing the cross-hatched pattern in said outer surface of said base by forming a plurality of very closely spaced depressions defined by intersecting ridge lines.

3. The improvement as defined in claim 2, in which said depressions are in a triangular or diamond shape.

4. The improvement as defined in claim 3, in which the cross-hatched pattern is formed by the mold plunger having a shaping surface in the form of a series of diamond-shaped mesas defined by intersecting grooves.

5. The improvement as defined in claim 4, in which the acute angles of the diamond-shaped mesas of the mold plunger are approximately 60° and the spacing between the individual mesas is between ten to thirty thousandths of an inch.

* * * * *